(12) United States Patent
Vasiliev et al.

(10) Patent No.: US 11,656,482 B2
(45) Date of Patent: May 23, 2023

(54) WEARABLE ELECTRO-OPTICAL DEVICE USING ELECTROCHROMIC LAYER

(71) Applicant: Vitro Flat Glass LLC, Cheswick, PA (US)

(72) Inventors: Evgeniy Vladimirovich Vasiliev, Novosibirsk (RU); Pavel Anatolievich Zaikin, Novosibirsk (RU); Nikita Valerievich Kruglikov, Novosibirsk (RU); Christian Lorentzen, Belmont, CA (US)

(73) Assignee: Vitro Flat Glass LLC, Cheswick, PA (US)

( * ) Notice: Subject to any disclaimer, the term of this patent is extended or adjusted under 35 U.S.C. 154(b) by 755 days.

(21) Appl. No.: 16/516,219

(22) Filed: Jul. 18, 2019

(65) Prior Publication Data

US 2020/0050023 A1 Feb. 13, 2020

Related U.S. Application Data

(63) Continuation of application No. 15/458,015, filed on Mar. 13, 2017, now Pat. No. 10,359,647, which is a
(Continued)

(51) Int. Cl.
*G02C 7/10* (2006.01)
*G02F 1/163* (2006.01)
(Continued)

(52) U.S. Cl.
CPC .......... *G02C 7/101* (2013.01); *G02B 27/0172* (2013.01); *G02F 1/157* (2013.01);
(Continued)

(58) Field of Classification Search
CPC .......... G02F 1/163; G02F 1/155; G02F 1/153; G02F 1/1533; G02F 1/157; G02F 1/1524; G02F 1/161; G02F 1/15165; G02F 1/1508; G02F 1/13318; G02F 1/1503; G02F 2001/1555; G02F 2001/15145;
(Continued)

(56) References Cited

U.S. PATENT DOCUMENTS 4,137,098 A 1/1979 Field
5,384,653 A 1/1995 Benson
(Continued)

FOREIGN PATENT DOCUMENTS

WO WO 2014/032023 2/2014

*Primary Examiner* — Collin X Beatty
*Assistant Examiner* — Grant A Gagnon
(74) *Attorney, Agent, or Firm* — The Webb Law Firm

(57) ABSTRACT

Flexible plastic screen for glasses, sunglasses or helmet faceshields with controlled light transmission based on applied electrical voltage. The screen consists of two transparent flexible conductive polymer electrodes disposed and an electrochromic layer disposed between them. The electrochromic layer is a homogeneous mixture of active electrochromic components dissolved in a polymer matrix. The electrochromic screen is operable to vary the light transmission of any wearable electro-optical devices, such as the glasses, for creating an effect of a blackout for augmented/virtual reality glasses.

23 Claims, 5 Drawing Sheets

Related U.S. Application Data continuation-in-part of application No. 14/800,626, filed on Jul. 15, 2015, now abandoned.

(60) Provisional application No. 62/307,560, filed on Mar. 13, 2016, provisional application No. 62/115,289, filed on Feb. 12, 2015, provisional application No. 62/025,004, filed on Jul. 15, 2014.

(51) Int. Cl.
  *G02F 1/157* (2006.01)
  *G02B 27/01* (2006.01)
  *G02F 1/1514* (2019.01)
  *G02F 1/153* (2006.01)

(52) U.S. Cl.
  CPC ...... *G02F 1/163* (2013.01); *G02B 2027/0178* (2013.01); *G02F 1/153* (2013.01); *G02F 2001/15145* (2019.01)

(58) Field of Classification Search
  CPC ............ G02F 2001/164; G02F 1/1523; G02F 2201/44; G02F 2203/11; G02F 1/0018; G02F 1/1525; G02F 2001/1536; G02F 2202/14; G02F 2202/36; G02F 1/0126; G02F 1/0147; G02F 2203/01; G02F 1/0121; G02F 1/133602; G02F 1/133603; G02F 1/1347; G02F 2001/1502; G02F 2001/1518; G02F 1/13306; G02F 1/133308; G02F 1/13336; G02F 1/133626; G02F 1/13439; G02F 1/13458; G02F 1/1506; G02F 2201/123; G02F 2201/38; G02F 2201/58; G02F 2203/10; G02F 1/0102; G02F 1/0107; G02F 1/0128; G02F 1/1309; G02F 1/1313; G02F 1/1323; G02F 1/13312; G02F 1/13324; G02F 1/133305; G02F 1/13338; G02F 1/1334; G02F 1/133512; G02F 1/133514; G02F 1/133516; G02F 1/133528; G02F 1/133615; G02F 1/1339; G02F 1/134345; G02F 1/1345; G02F 1/137; G02F 1/13737; G02F 1/1516; G02F 1/1676; G02F 2001/1635; G02F 2201/083; G02F 2201/086; G02F 2201/122; G02F 2201/16; G02F 2201/50; G02F 2201/508; G02F 2202/00; G02F 2202/02; G02F 2202/023; G02F 2202/28; G02F 2203/02; G02F 2203/055; G02F 2203/62; G02B 5/23; G02B 26/02; G02B 5/208; G02B 19/0042; G02B 1/18; G02B 26/005; G02B 27/0006; G02B 27/58; G02B 5/003; G02B 5/005; G02B 5/0808; G02B 6/0055; G02B 6/0056; G02B 7/021; G02C 7/101; G02C 7/102
  USPC .......................................................... 359/275
  See application file for complete search history.

(56) References Cited

U.S. PATENT DOCUMENTS

| | | | |
|---|---|---|---|
| 2012/0033286 A1* | 2/2012 | Yashiro | G02F 1/1533 427/68 |
| 2012/0212414 A1 | 8/2012 | Osterhout | |
| 2012/0235900 A1 | 9/2012 | Border | |
| 2013/0201546 A1 | 8/2013 | Berland | |
| 2013/0235323 A1 | 9/2013 | Sotzing | |
| 2015/0286073 A1* | 10/2015 | Blum | G02C 7/102 351/159.66 |
| 2016/0333636 A1 | 11/2016 | Bonucci | |

* cited by examiner

WEARABLE ELECTRO-OPTICAL DEVICE USING ELECTROCHROMIC LAYER

CROSS-REFERENCE TO RELATED PATENT APPLICATIONS

This application is a continuation application of U.S. patent application Ser. No. 15/458,015, filed on Mar. 13, 2017, which claims the benefit of priority from U.S. Provisional Patent Application No. 62/307,560, filed on Mar. 13, 2016, and which is a continuation-in-part of U.S. patent application Ser. No. 14/800,626, filed on Jul. 15, 2015, which claims the benefit of priority from U.S. Provisional Patent Application No. 62/025,004, filed on Jul. 15, 2014, and U.S. Provisional Patent Application No. 62/115,289, filed on Feb. 12, 2015, the entirety of which are incorporated herein by reference.

BACKGROUND OF THE INVENTION

Field of the Invention

The disclosed embodiments relate in general to the field of electrochromic devices and, more specifically, to wearable electro-optical devices, such as virtual/augmented reality glasses, sunglasses or helmet faceshields with controlled light transmittance utilizing an electrochromic device.

Description of the Related Art

Wearable electro-optical devices with controlled light transmittance generally include sunglasses, helmet faceshields as well as virtual/augmented reality glasses. Sunglasses and helmet faceshields are used to protect the owner's eyes from excessive exposure to direct and reflected sunlight. On the other hand, augmented reality glasses are often combined with virtual reality glasses, which requires the ability to easily switch between these two modes. Specifically, in the virtual reality mode, the glasses must be completely opaque and the user only sees the computer-generated imagery and other information. In the augmented reality mode, the user sees at least portion of the ambience as well as interposed computer-generated imagery and other information.

Moreover, conventional sunglasses or helmet faceshields are not capable of changing their light transmittance, while many real-world applications of these devices require adjustment of the light transmittance based on the ambient lighting conditions. In other words, it would be desirable to effectively control the light transmittance of sunglasses or helmet faceshields.

The aforesaid problem has been partially solved in the photochromic lenses and glasses. Photochromic lenses comprise a photosensitive component. Photosensitive components become less transparent when exposed to ultraviolet (UV) radiation. On the other hand, in the absence of the UV exposure, the photochromic components regain their original transparency. Examples of these light-sensitive components include silver halides or oxazines and naphthopyrans.

Unfortunately, the aforesaid photochromic lenses have a number of significant drawbacks. Typical light transmittance change time in photochromic lenses in response to exposure to UV radiation is a few minutes. In addition, they respond only to UV radiation. Moreover, when the exposure to the UV radiation is terminated, the lenses require comparable time to recover their light transmission ability. Yet furthermore, photochromic lenses are temperature dependent.

Thus, it would be desirable to have glasses, sunglasses or helmet faceshields with controlled light transmittance. Therefore, new and improved methods for manufacturing of virtual/augmented reality glasses, sunglasses or helmet faceshields are needed that would not be subject to the above deficiencies of the prior art technology.

SUMMARY OF THE INVENTION

The inventive methodology is directed to methods and systems that substantially obviate one or more of the above and other problems associated with conventional wearable electro-optical devices.

In accordance with one aspect of the embodiments described herein, there is provided a wearable electro-optical device comprising: an electrochromic layer comprising electrochromic composition comprising a cathodic component in the form of a quaternary salt of dipyridine, an anodic component in the form of a ferrocene derivative or heterocyclic compound capable of switching between two oxidation states, a polymeric thickener and a solvent, wherein the cathodic component comprises a salt of cation of 1,1'-dialkyl-4,4'-dipyridinium (alkyl group) or 1,1-(alkane-alpha (alkaline spacer), omega-diyl)-bis-(1'-alkyl-4,4'-dipiridinium) with weakly coordinated anions; a controller electrically coupled to the electrochromic layer and configured to apply a controlling voltage to the electrochromic layer in response to a received control command to vary light transmittance of the electrochromic layer; and a power source for supplying electrical power to the controller.

In one or more embodiments, the alkyl group is selected from C1-C8 saturated alkyl, benzyl, phenyl or substituted aryls.

In one or more embodiments, the alkane spacer is selected from a C3-C5 alkane chain.

In one or more embodiments, the anion of quaternary salt is non-nucleophilic and comprises $BF_4^-$, $PF_6^-$, $ClO_4^-$, $CF_3SO_3^-$ or $(CF_3SO_2)_2N^-$ or $(CF_3SO_2)_3C^-$.

In one or more embodiments, the polymeric thickener comprises a methyl methacrylate or its copolymer with acrylic and methacrylic acid or its salts, polyvinyl acetate, a polylactic acid, or poly-3-hydroxybutyrate or its copolymers.

In one or more embodiments, the solvent comprises propylene carbonate, gamma-butyrolactone, gamma-valerolactone, N-methylpyrrolidone or di-, tri-polyethylene glycols or their esters.

In one or more embodiments, the electrochromic composition further comprises between 0.4% and 3.6% of the cathodic component, between 30% and 45% of polymer thickener, between 0.3 and 3.0% of the anodic component and the balance being the solvent.

In one or more embodiments, the electrochromic composition further comprises at least one antioxidant.

In one or more embodiments, the at least one antioxidant comprises a polyphenol.

In one or more embodiments, the at least one antioxidant comprises a sterically hindered phenol.

In one or more embodiments, the at least one antioxidant comprises an ionol.

In one or more embodiments, the wearable electro-optical device further comprising an ultraviolet filter.

In one or more embodiments, the ultra-violet filter comprises a benzophenone.

In one or more embodiments, the ultra-violet filter comprises a cinnamate.

In one or more embodiments, the wearable electro-optical device is glasses.

In one or more embodiments, the wearable electro-optical device is virtual/augmented reality glasses.

In one or more embodiments, the control command is received from virtual/augmented reality software.

In one or more embodiments, in response to the control command, the controller causes the electrochromic layer to have a high light transmittance and wherein the control command is issued when the virtual/augmented reality software operates in an augmented reality mode.

In one or more embodiments, in response to the control command, the controller causes the electrochromic layer to have a low light transmittance and wherein the control command is issued when the virtual/augmented reality software operates in a virtual reality mode.

In one or more embodiments, the wearable electro-optical device is a helmet faceshield.

In one or more embodiments, the wearable electro-optical device further comprises a control button electrically coupled to the controller and operable to receive the control command from the user.

In one or more embodiments, the wearable electro-optical device further comprises a sensor of ambient light electrically coupled to the controller and wherein the controller is operable to vary light transmittance of the electrochromic layer based on a signal from the sensor of ambient light.

In one or more embodiments, in response to the control command, the controller causes the electrochromic layer to have a high light transmittance when the sensor of ambient light indicates low ambient light condition.

In one or more embodiments, in response to the control command, the controller causes the electrochromic layer to have a low light transmittance when the sensor of ambient light indicates high ambient light condition.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
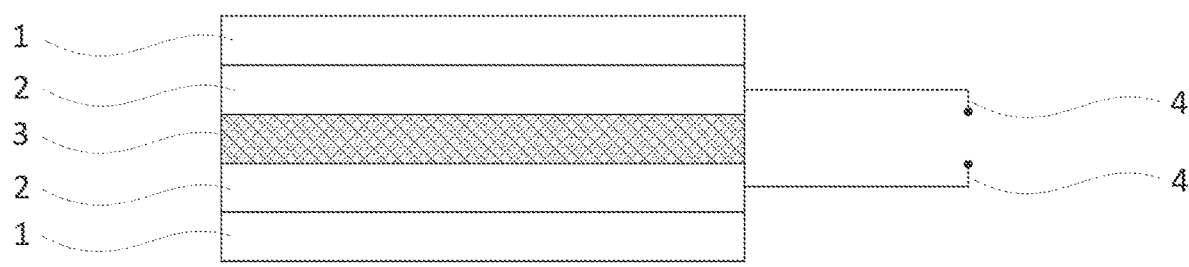
FIG. 1 illustrates an exemplary application of an embodiment of the described electrochromic composition in electrochromic devices such as electronically controlled virtual/augmented reality glasses, sunglasses and helmet faceshields.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there is provided a novel virtual/augmented reality glasses. In one embodiment, to enable a rapid switch between the virtual and augmented reality modes, the aforesaid glasses incorporate an additional optical layer, which can be electrically switched between being completely opaque to the incident light in the visual spectrum in a virtual reality mode to being at least partially transparent to the visual spectrum light in the augmented reality mode. In one embodiment, such rapid change in the light transmittance of the virtual/augmented reality glasses is accomplished using an electrochromic optical layer disposed in the virtual/augmented reality glasses, which is electrically coupled to a controller device incorporating an electrical power source. The controller is configured to apply voltage to the electrochromic optical layer such as to achieve a desired degree of light transmission. In one or more embodiments, the aforesaid controller may be activated by user's computing device, such as a smartphone, a personal computer or a computing device embedded into the virtual/augmented reality glasses.

In accordance with another aspect of the embodiments described herein, there is provided a novel sunglasses and helmet faceshields incorporating an additional optical layer with electrically controlled light transmittance. In one embodiment, the aforesaid additional optical layer is a photochromic layer coupled to a controller device incorporating an electrical power source. The controller is configured to apply voltage to the electrochromic optical layer such as to achieve a desired degree of light transmission. In one embodiment, the aforesaid sunglasses and helmet faceshields are action glasses or action helmet faceshields.

In accordance with one aspect of the embodiments described herein, there are provided electrochromic compositions for use in devices with electrically controlled (voltage-controlled) absorption of light such as electronically controlled virtual/augmented reality glasses, sunglasses and helmet faceshields. Various embodiments of the described electrochromic compositions may be used, for example, for creating light-transmitting coatings of electronically controlled virtual/augmented reality glasses, sunglasses and helmet faceshields Specifically, described is an embodiment of an organic electrochromic composition that is based an biocompatible and biodegradable components and is characterized by an increased service life as well as a high rate of light-transmittance change in response to the change in the controlled voltage. The described novel techniques enable preparing electrochromic compositions in a wide range of light-absorption spectra and coating colors.

In one or more embodiments, there is provided an electrochromic composition comprising a cathodic component such as—1,1'-dialkyl-4, 4'-bipyridine with anions of $BF_4^-$, $PF_6^-$, $ClO_4^-$, $CF_3SO_3^-$ or $(CF_3SO_2)_2N^-$; an anodic component such as 0.3 to 3.0% of a ferrocene derivative; an electrode reaction accelerator additive such as 0.5% % of a ferrocenium salt; and a solvent such as propylene carbonate or N-methylpyrrolidone or a di-, tri-, [or another] polyethylene glycole or their ethers as the balance.

Specifically, in one exemplary embodiment, the electrochromic composition comprises a cathodic component in the form of 1,1'-dialkyl-4, 4'-bipyridine with complex fluoride anions such as $BF_4^-$, $PF_6^-$, and organic anions such as $CF_3SO_3^-$ or $(CF_3SO_2)_2N^-$; an anodic component in the form of a ferrocene derivative; and a solvent such as propylene carbonate or N-methylpyrrolidone or di-, tri-, [or other] polyethylene glycols and their esters; as well as biodegradable polymers in the form of polylactic acid or poly-3-hydroxybutyrate; the components being used in the following mass percentage quantities: 0.3 to 3.2 of the cathodic component in the form of 1,1'-dimethyl-4,4'-dipyridine with anions such as $BF_4^-$ and $ClO_4^-$ or 0.5 to 4.4 of 1,1'-dibenzyl-4,4'-dipyridine with anions $BF_4^-$ and $ClO_4^-$; 0.3 to 3.0 of the anodic component in the form of a ferrocene derivative; and the balance being a solvent. The described electrochromic composition is characterized by the replacement of used solvent and polymer thickener as well as simplification of the component composition.

In one or more embodiments, the additives comprise antioxidants including, without limitation, polyphenols, sterically hindered phenols, and/or ionol; and UV filters such as benzophenones and cinnamates.

It should be noted that modification of the described components imparts to the composition new properties, i.e., improved service life and increased rate of switching of light transmittance with application of the control voltage.

In one or more embodiments, an electrochromic device for testing of the compositions consisted of two polymer films coated on their inner sides with semiconductor coatings of $In_2O_3$ films with doping additives or films coated with current-conductive metal meshes. The distance between the films in the device was determined by the thickness of the inert filler introduced into the electrochromic composition for maintaining a constant thickness of the electrochromic layer. The electrochromic composition was introduced between the films, and then both films were bonded to one another over the perimeter.

Certain specific examples of the application of the described electrochromic composition will now be described.

Example 1

A first exemplary composition was prepared by dissolving 1,1'-dibenzyl-4,4'-bipyridinium di(perchlorate) to a concentration of 1.2% and 1,1'-diethylferrocene as well as a copolymer of methylacrylate and acrylic acid to a concentration of 33.8% in propylene carbonate. The resulting composition was used for constructing an electrochromic device having the thickness of the inter-electrode spacing being 100 μm. In the initial state, the composition had a light yellowish color. When voltage of 1.5 V was applied, the color turned blue. Initial transmittance was 70%. The electrochromic device was tested for 8 hours per day under the following conditions: coloring for 30 seconds at U=1.5 V and discoloration for 30 seconds by circuiting the electrodes. After 3 and 6 months of work in a non-colored state, the light transmittance was 65% and 61%, respectively.

Example 2

A second exemplary composition was prepared by dissolving 1,1'-dibenzyl-4,4'-bipyridinium di(perchlorate) to concentration of 1.2% 1,1'-diethylferrocene to a concentration of 0.5%, and a copolymer of methylacrylate and acrylic acid to a concentration of 33.8% in propylene carbonate. The resulting composition was used for filling a 50-μm interelectrode space of the electrochromic device. In the initial state, the composition was practically colorless. When voltage of 1.5 V was applied, the color turned blue. Initial transmittance was 78%. The electrochromic device was tested for 8 hours per day under the following conditions: coloring for 30 seconds at U=1.5 V and discoloration for 30 seconds by circuiting the electrodes. After 3 and 6 months of work in a noncolored state, transmittance was 75% and 69%, respectively.

Example 3

A third exemplary composition was prepared by dissolving 1,1'-dibenzyl-4,4'-bipyridinium di(perchlorate) to a concentration of 1.2%, 1,1'-diethylferrocene to a concentration of 0.5%, and polyvinyl acetate to a concentration of 34% in propylene carbonate. The resulting composition was used for filling a 50-μm interelectrode space of an electrochromic device. In the initial state, the composition was practically colorless. When voltage of 1.5 V was applied, the color turned blue. Initial transmittance was 77%. The electrochromic device was tested for 8 hours per day under the following conditions: coloring for 30 seconds at U=1.5 V and discoloration for 30 seconds by circuiting the electrodes. After 3 and 6 months of work in a noncolored state, transmittance was 73% and 65%, respectively.

In one or more embodiments, the upper limit of concentrations was determined by solubility of quaternary salts of bipyridine in the solvent used, and the lower limit was defined by the minimal value of light absorption in an electrically colored state at which it became unsuitable for practical use. Furthermore, the proposed composition comprises an additive that accelerates electrode reaction and thus shortens switching time of the device.

The embodiments of the electrochromic compositions for use in electronically controlled virtual/augmented reality glasses, sunglasses and helmet faceshields described herein have a prolonged service life, during which the main optical light characteristic, i.e., light transmittance, is preserved.

FIG. 1 illustrates an exemplary application of an embodiment of the described electrochromic composition in electrochromic devices such as electronically controlled virtual/augmented reality glasses, sunglasses and helmet faceshields.

In the exemplary embodiment illustrated in FIG. 1, the described electrochromic composition (3) is embodied as a layer (3) of an arbitrary thickness located between two transparent conductive layers (2). The thickness of the electrochromic layer is defined by the specific use and may range from 25 μm to 20 μm. Transparent conductive layers (2) are arranged on a substrate (1), which functions as a protective and fixing layer. Control voltage is supplied to the transparent electrically conductive layers (4) by lead wires or loops.

In accordance with another aspect of the embodiments described herein, there are provided novel electrochromic devices with an integrated electrical power source for electrically controlling, by varying applied electrical voltage, the absorption of light in the electro-optic devices, such as electronically controlled virtual/augmented reality glasses, sunglasses and helmet faceshields. Various embodiments of the described novel electrochromic devices may be used, for example, for creating variable light-transmitting coatings of electronically controlled virtual/augmented reality glasses, sunglasses and helmet faceshields. Even though the following description uses the a power cell as an exemplary integrated electrical power source, the aforesaid integrated electrical power source can be any now known or later developed source of electrical energy, including, without limitation, photovoltaic (solar) cell, non-rechargeable battery, such as alkaline battery, rechargeable battery, such as NiCd, NiMH or lithium battery, nuclear isotope power generator, induction-based generator, and/or piezoelectric generator. As would be appreciated by persons of ordinary skill in the art, the invention is not limited to any specific electrical power source and any other now known or later developed source of electrical energy can also be used.

Figure 2:
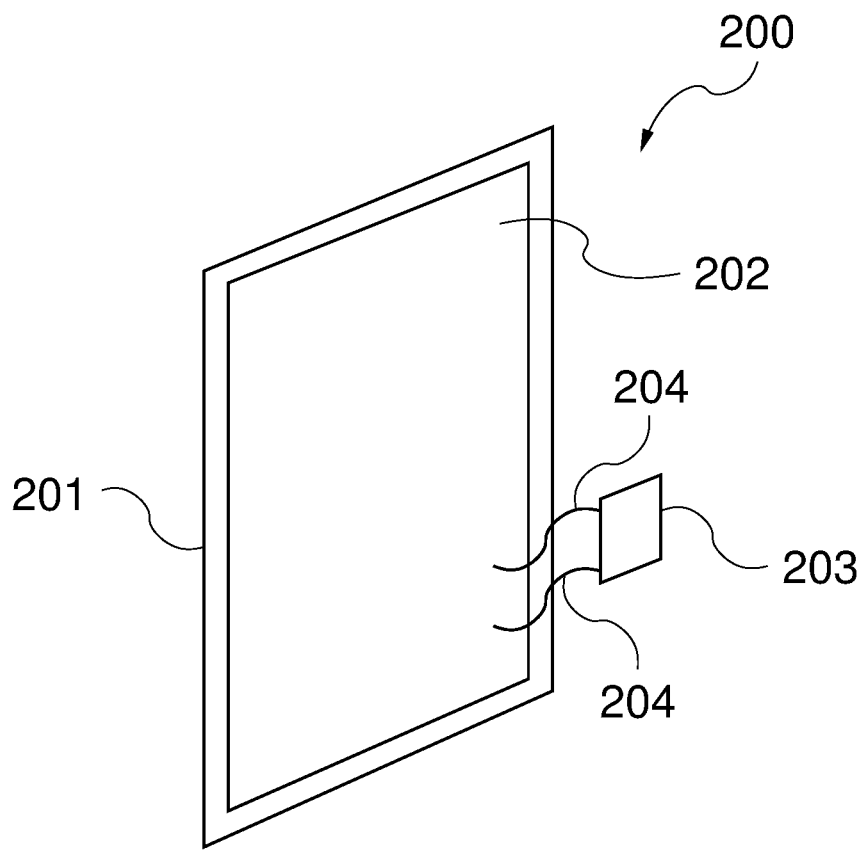
FIG. 2 illustrates a first exemplary embodiment of an electrochromic device with an integrated electrical power source.

FIG. 2 illustrates a first exemplary embodiment 200 of an electrochromic device with an integrated electrical power source. In one or more embodiments, the electrochromic device 200 is disposed on a glass substrate 201, which could be a lens of glasses or a lens of a faceshield of a helmet or any other type of optically transparent rigid or semi-rigid material. The electrochromic device 200 further includes an active electrochromic film of glass layer 202 mechanically attached to the glass substrate 201 using appropriate adhesion technique, such as glue or electrostatic adhesion. The electrochromic layer 202 is capable of varying its optical properties based on electric voltage applied to the electrochromic layer 202. The aforesaid optical properties may include transparency, color and/or opacity.

In one or more embodiments, the electrochromic device 200 further incorporates a power cell 203 for generating electrical energy for controlling the optical properties of the electrochromic layer 202. To deliver the generated electrical energy from the power cell 203 to the electrochromic layer 202, the latter are connected using electric conducting wiring 204. In one or more embodiments, a controller may be provided or near the power cell 203 for controlling the optical properties of the electrochromic layer 202 based on user commands by utilizing the electrical energy generated by the power cell 203. On one or more embodiments, the power cell 203 is disposed in the close proximity of the electrochromic layer 202, such as within the enclosure of the virtual/augmented reality glasses, sunglasses or the helmet. The controller is configured to convert the electrical energy generated by the power cell 203 to achieve the necessary voltage (or current) for controlling the optical properties of the electrochromic layer 202 consistent with the user's commands or with the content being provided to the user. In one or more embodiments, the controller may incorporate a voltage converter, such as a buck converter well known to persons of ordinary skill in the art. In the same or different embodiment, the controller may incorporate a wireless receiver for receiving user's commands from a remote control operated by the user. The wireless receiver may be a radio-based receiver or an infra-red based receiver.

Figure 3:
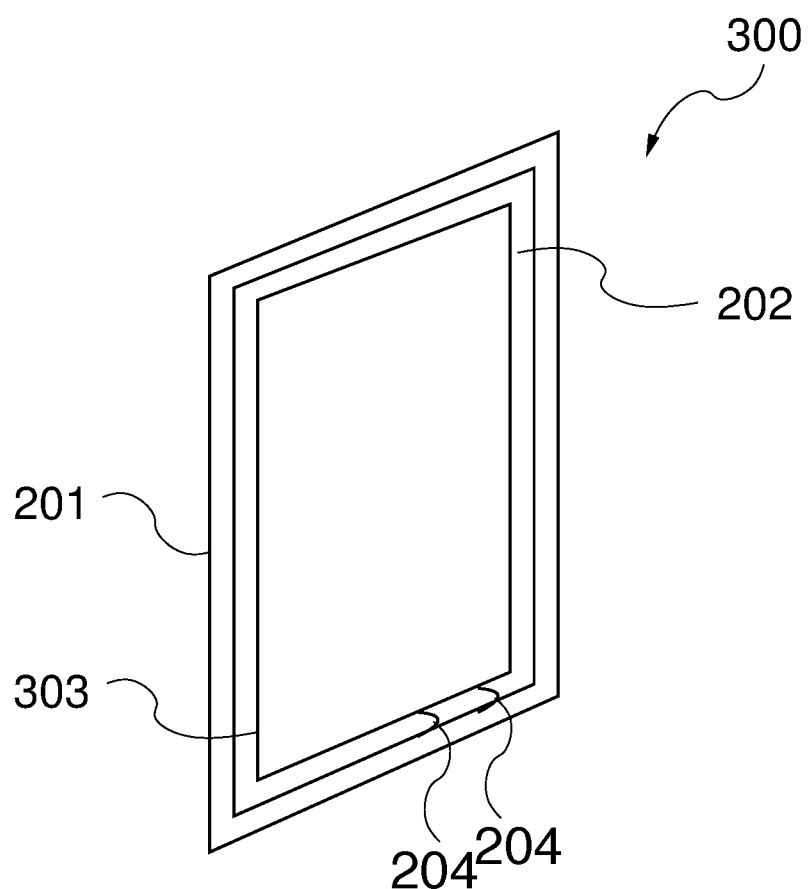
FIG. 3 illustrates a second exemplary embodiment of an electrochromic device with an integrated electrical power source.

FIG. 3 illustrates a second exemplary embodiment 300 of an electrochromic device with an integrated electrical power source. In one or more embodiments, the electrochromic device 300 is also disposed on the glass substrate 201, which could be a lens of glasses or a lens of a faceshield of a helmet or any other type of optically transparent rigid or semi-rigid material. The electrochromic device 300 further includes an active electrochromic film or glass layer 202 mechanically attached to the glass substrate 201 using appropriate adhesion technique, such as or electrostatic adhesion. The electrochromic layer 202 is capable of varying its optical properties based on electric voltage applied to the electrochromic layer 202.

In one or more embodiments, the electrochromic device 300 further incorporates a photovoltaic cell 303 for generating electrical energy for controlling the optical properties of the electrochromic layer 202. In the electrochromic device 300, the photovoltaic cell 203 is made of a transparent material and disposed directly on the glass substrate 201 or on the electrochromic layer 202 or between them. The photovoltaic cell 203 may be directly mechanically attached to the glass substrate 201 and/or on the electrochromic layer 202 using glue or other adhesion systems or methods known in the art.

Electrically conducting wiring 204 conducts the electric energy generated by the photovoltaic cell 303 to the electrochromic layer 202 in order to control the optical properties of the electrochromic layer 202 in a manner specified by the user. In one or more embodiments, a controller may be also provided with substantially similar functions to the controller described above in connection with the embodiment 200 illustrated in FIG. 2.

In various embodiments, the aforesaid controller has a Bluetooth, Wi-Fi and/or infra-red connectivity allowing the users to use their mobile devices to control the described electrochromic device. In one embodiment, the controller may wirelessly communicate with virtual/augmented reality computing device, such as gaming PC, which provides the appropriate digital content to the user. In this embodiment, the controlled would cause the opacity of the electrochromic layer to change based on the digital content provided to the user by the virtual/augmented reality computing device, such as gaming PC. In another embodiment, the controller incorporate one or more ambient conditions sensors such as luminosity sensor and is configured to control the optical properties of the electrocjromis layer based on the detected ambient conditions. For example, when a bright ambient light is detected, the controller may be configured to increase opacity of the electrochromic layer.

In various embodiments, the functionality of the controller may accessible through a software application executing on iOS, Android (or other operating systems) as well as from a computer using an application programming interface. In one embodiment, the controller can mate with a wireless remote switch.

In one embodiment, the electrochromic layer made utilizing the method described herein is characterized by low cost and ease of manufacturing. Moreover, this layer is characterized by fast response times being capable of switching in a matter of seconds between the transparent state (about 85% transmission) and darkened state (about 1.5% transmission). Additional advantages of the aforesaid electrochromic layer include its flexibility (bending radius can reach 4 cm) and the possibility of obtaining the optical layer of various colors in low lighting conditions, such as blue, purple, black, green, brown.

Furthermore, adding ultraviolet (UV) blocking compounds to the electrochromic composition enables effective UV blocking by the glasses, sunglasses or helmet faceshields manufactured based on the described technology in both opaque and transparent operating modes.

The response time of the glasses, sunglasses or helmet faceshields manufactured based on the described technology may be improved by introducing into the electrochromic composition indifferent electrolytes and/or ionic liquids. In this embodiment, the response time of the glasses, sunglasses or helmet faceshields may be reduced to 3-10 seconds, which permits near real-time response to the changes in ambient light conditions.

When used in the dark mode, the aforesaid electrochromic composition blocks electromagnetic radiation in the entire visible range, which enables the use of the electrochromic layer in the virtual/augmented reality glasses, capable of switching between virtual and augmented reality modes.

Finally, because the described electrochromic composition may be used in conjunction with flexible electrically conductive electrodes for producing electrochromic devices, this simplifies the process for incorporating the described electrochromic layer into the virtual/augmented reality glasses, sunglasses or helmet faceshields.

Figure 4:
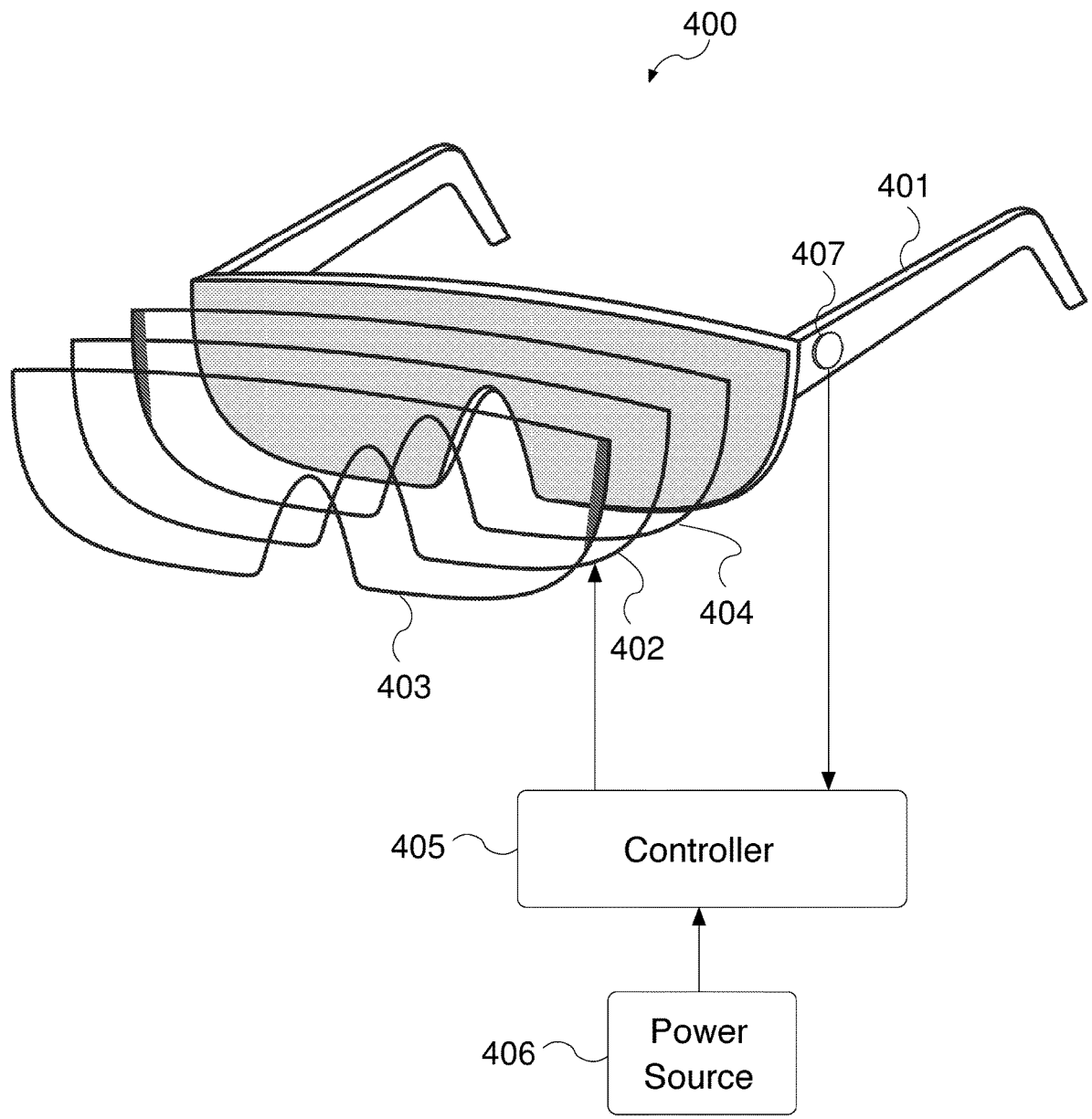
FIG. 4 illustrates an exemplary embodiment of sunglasses or virtual/augmented reality glasses using a photochromic layer operating in a transparent optical mode.

FIG. 4 illustrates an exemplary embodiment of sunglasses or virtual/augmented reality glasses 400 using the described photochromic layer. The embodiment 400 incorporates glasses frame 401 as well as a plurality of optical layers 402, 403 and 404. The optical layer 402 is an electrochromic layer configured to change its light transmittance in response to a control voltage supplied by a controller 405. The controller 405 is powered by a power source 406, which may be a battery, such as a lithium battery, a photovoltaic cell or any other type of electric power source. The controller 405 is configured to cause a desired change in the light transmittance of the electrochromic layer 402 in response to the user pressing a control button 407. Upon detecting the button press event, the controller 405 applies the corresponding voltage to the electrochromic layer 402 to achieve a user-specified degree of light transmittance of the sunglasses or virtual/augmented reality glasses 400. In an alternative embodiment, the transmittance of the sunglasses or virtual/augmented reality glasses 400 is controlled automatically, based on the context of the user. For example, the virtual or augmented reality software may automatically cause the electrochromic layer 402 to achieve specific optical parameters required by its current operating mode (e.g. Virtual reality or augmented reality). In one or more embodiments, the optical layer 403 is a ultra-violet filter.

In the embodiment 400 shown in FIG. 4, the electrochromic layer 402 is in a transparent optical mode, which is characterized by high degree of light transmittance. Such mode may be used when the virtual/augmented reality glasses 400 operate in an augmented reality mode or when sunglasses are used in low-light environment. To this end, the controller 405 may receive an appropriate command from virtual/augmented reality software or from a sensor of ambient light (not shown).

Figure 5:
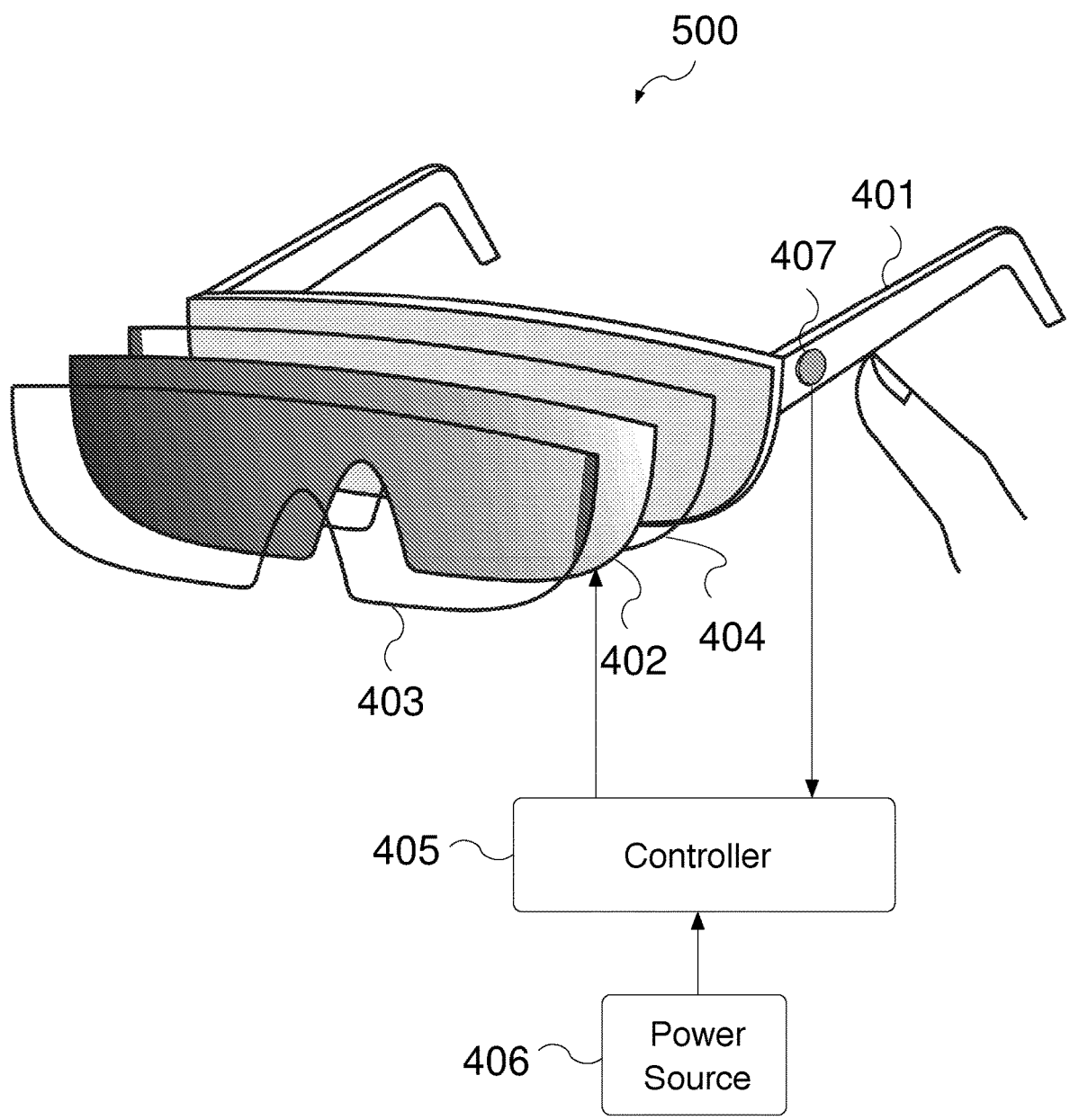
FIG. 5 illustrates an exemplary embodiment of sunglasses or virtual/augmented reality glasses using a photochromic layer operating in an opaque optical mode.

On the other hand, in the embodiment 500 shown in FIG. 5, the electrochromic layer 402 is in an opaque optical mode, which is characterized by low degree of light transmittance. Such mode may be used when the virtual/augmented reality glasses 500 operate in a virtual reality mode or when sunglasses are used in bright light environment, such as daylight.

It should be noted that the aforesaid embodiments 400 and 500 may incorporate a variety of other elements, such as optical components for creating a projected computer-generated image in user's field of view and use in virtual/augmented reality mode. Such components are well known to persons of ordinary skill in the art and, thus, are not described herein. Furthermore, the described concepts and techniques are not limited in their application to only virtual/augmented reality glasses, sunglasses or helmet faceshields. The same described systems and components may be used in any now known or later developed wearable or none-wearable electro-optical devices, including goggles, night vision goggles, binoculars, night vision binoculars and the like. As would be appreciated by persons of ordinary skill in the art, the above techniques may be especially useful for protecting night vision equipment from damage caused by bright light.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in wearable electro-optical devices, such as virtual/augmented reality glasses, sunglasses or helmet faceshields with controlled light transmittance utilizing an electrochromic device. It is intended that the specification and examples be considered as exemplary only, with a true scope and spirit of the invention being indicated by the following claims.

What is claimed is:

1. A wearable electro-optical device comprising:
    an electrochromic layer of active electrochromic components dissolved in a polymer matrix, wherein the electrochromic layer comprises an electrochromic composition comprising a cathodic component in the form of a quaternary salt of dipyridine and an anodic component;
    a controller electrically coupled to the electrochromic layer and configured to apply a controlling voltage to the electrochromic layer causing an electric charge to pass through the electrochromic layer in response to a received control command to vary light transmittance of the electrochromic layer; and
    a power source for supplying electrical power to the controller.

2. The wearable electro-optical device of claim 1, wherein the anodic component is in the form of a ferrocene derivative or heterocyclic compound capable of switching between two oxidation states.

3. The wearable electro-optical device of claim 1, wherein the wearable electro-optical device further comprises a control button electrically coupled to the controller and operable to receive the control command from a user.

4. The wearable electro-optical device of claim 1, wherein the wearable electro-optical device further comprises a sensor of ambient light electrically coupled to the controller and wherein the controller is operable to vary light transmittance of the electrochromic layer based on a signal from the sensor of ambient light.

5. The wearable electro-optical device of claim 1, wherein the electrochromic layer is disposed between two flexible electrically conductive electrodes.

6. The wearable electro-optical device of claim 1, further including an integrated power source for supplying electrical power to the controller.

7. The wearable electro-optical device of claim 6, wherein the integrated power source is a non-rechargeable or rechargeable battery.

8. The wearable electro-optical device of claim 1, wherein control incorporates a voltage converter.

9. The wearable electro-optical device of claim 1, wherein the control incorporates a wireless receiver for receiving a user's command from a remote control operated by the user.

10. The wearable electro-optical device of claim 1, wherein the cathodic component comprises a salt of cation of 1,1'-dialkyl-4,4'-dipyridinium (alkyl group) or 1,1-(alkane-alpha (alkaline spacer), omega-diyl)-bis-(1'-alkyl-4,4'-dipiridinium) with weakly coordinated anions.

11. The wearable electro-optical device of claim 1, wherein the light transmittance of the electrochromic layer changes between a transparent state and darkened state in approximately 3-10 seconds or in real-time.

12. The wearable electro-optical device of claim 1, wherein the light transmittance of the electrochromic layer occurs in the absence of heat.

13. Virtual or augmented reality glasses comprising:
    (a) an electrochromic layer, wherein the electrochromic layer comprises an electrochromic composition comprising a cathodic component in the form of a quaternary salt of dipyridine and an anodic component;
    (b) a controller electrically coupled to the electrochromic layer and configured to apply a controlling voltage to the electrochromic layer causing an electric charge to pass through the electrochromic layer in response to a received control command to vary light transmittance of the electrochromic layer; and
    (c) a power source for supplying electrical power to the controller.

14. The virtual or augmented reality glasses of claim 13, wherein the control is activated by a user's computing device.

15. The virtual or augmented reality glasses of claim 14, wherein light transmission of the electrochromic layer changes based on digital content provided the user's computing device.

16. The virtual or augmented reality glasses of claim 13, wherein the control incorporates one or more ambient conditions sensors and is configured to control the optical properties of the electrochromic layer based on the detected ambient conditions.

17. The virtual or augmented reality glasses of claim 13, wherein the electrochromic layer comprises active electrochromic components dissolved in a polymer matrix.

18. Sun glasses comprising:
    (a) an electrochromic layer, wherein the electrochromic layer comprises an electrochromic composition comprising a cathodic component in the form of a quaternary salt of dipyridine and an anodic component;
    (b) a controller electrically coupled to the electrochromic layer and configured to apply a controlling voltage to the electrochromic layer causing an electric charge to pass through the electrochromic layer in response to a received control command to vary light transmittance of the electrochromic layer; and
    (c) a power source for supplying electrical power to the controller.

19. The sun glasses of claim 18, wherein the sun glasses further comprises a sensor of ambient light electrically coupled to the controller and wherein the controller is operable to vary light transmittance of the electrochromic layer based on a signal from the sensor of ambient light.

20. The sun glasses of claim 18, wherein the sun glasses further comprises a control button electrically coupled to the controller and operable to receive the control command from a user.

21. The sun glasses of claim 18, further including an integrated power source for supplying electrical power to the controller.

22. The sun glasses of claim 18, wherein the electrochromic layer further comprises ultraviolet blocking compounds.

23. The sun glasses of claim 18, wherein the electrochromic layer comprises active electrochromic components dissolved in a polymer matrix.

* * * * *